(12) United States Patent
Noris

(10) Patent No.: US 11,210,860 B2
(45) Date of Patent: Dec. 28, 2021

(54) SYSTEMS, METHODS, AND MEDIA FOR VISUALIZING OCCLUDED PHYSICAL OBJECTS RECONSTRUCTED IN ARTIFICIAL REALITY

(71) Applicant: Facebook Technologies, LLC, Menlo Park, CA (US)

(72) Inventor: Gioacchino Noris, Zurich (CH)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/773,808

(22) Filed: Jan. 27, 2020

(65) Prior Publication Data

US 2021/0233313 A1 Jul. 29, 2021

(51) Int. Cl.
*G09G 5/00* (2006.01)
*G06T 19/00* (2011.01)
(Continued)

(52) U.S. Cl.
CPC ........ *G06T 19/006* (2013.01); *G02B 27/0172* (2013.01); *G06T 7/50* (2017.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

| 10,124,257 | B2 | 11/2018 | Stafford |
| 2003/0034974 | A1 | 2/2003 | Welch |

(Continued)

FOREIGN PATENT DOCUMENTS

| EP | 2660643 A2 | 11/2013 |
| EP | 3163407 A1 | 5/2017 |

(Continued)

OTHER PUBLICATIONS

International Search Report and Written Opinion for International Application No. PCT/US2020/067020, dated Apr. 19, 2021.

(Continued)

*Primary Examiner* — Gordon G Liu
(74) *Attorney, Agent, or Firm* — Baker Botts L.L.P.

(57) ABSTRACT

A computing system may compute estimated depth measurements of at least one physical object in a physical environment surrounding a user. The system may generate, based on the estimated depth measurements, a first model of the at least one physical object. The system may render, based on the first model and a second model of a virtual object, an image depicting the physical object and the virtual object from a perspective of the user. At least one pixel of the image has a blended color corresponding to a portion of the physical object and a portion of the virtual object. The blended color is computed in response to a determination that a relative depth between a portion of the first model corresponding to the portion of the physical object and a portion of the second model corresponding to the portion of the virtual object is within a threshold.

20 Claims, 16 Drawing Sheets
(4 of 16 Drawing Sheet(s) Filed in Color)

(51) Int. Cl.
*G06T 7/50* (2017.01)
*G06T 15/00* (2011.01)
*G02B 27/01* (2006.01)
*G06T 15/50* (2011.01)

(52) U.S. Cl.
CPC .......... *G06T 15/005* (2013.01); *G06T 15/503* (2013.01); *G02B 2027/0138* (2013.01)

(58) Field of Classification Search
USPC ........................................................ 345/633
See application file for complete search history.

(56) References Cited

U.S. PATENT DOCUMENTS

| | | | |
|---|---|---|---|
| 2012/0092328 | A1* | 4/2012 | Flaks ................. G06F 3/012 345/419 |
| 2013/0005467 | A1 | 1/2013 | Kim |
| 2013/0093788 | A1 | 4/2013 | Liu |
| 2015/0235610 | A1* | 8/2015 | Miller ................. G06K 9/38 345/633 |
| 2017/0287215 | A1 | 10/2017 | Lalonde |
| 2017/0365100 | A1* | 12/2017 | Walton ............... G06K 9/00624 |
| 2018/0067316 | A1 | 3/2018 | Lee |
| 2018/0068488 | A1* | 3/2018 | Hart ..................... A63F 13/00 |
| 2018/0088323 | A1 | 3/2018 | Bao |
| 2018/0232056 | A1 | 8/2018 | Nigam |
| 2018/0364801 | A1 | 12/2018 | Kim |
| 2019/0101758 | A1 | 4/2019 | Zhu |
| 2019/0197765 | A1 | 6/2019 | Molyneaux |
| 2019/0213789 | A1 | 7/2019 | Uyyala |
| 2019/0220002 | A1 | 7/2019 | Huang |
| 2019/0243448 | A1 | 8/2019 | Miller |
| 2020/0020166 | A1 | 1/2020 | Menard |
| 2020/0026922 | A1 | 1/2020 | Pekelny |
| 2020/0334908 | A1 | 10/2020 | Wilson et al. |

FOREIGN PATENT DOCUMENTS

| | | |
|---|---|---|
| GB | 2376397 A | 12/2002 |
| WO | WO 2017079657 A1 | 5/2017 |

OTHER PUBLICATIONS

International Search Report and Written Opinion for International Application No. PCT/US2020/067055, dated Apr. 21, 2021.
Ballan, et al., Unstructured Video-Based Rendering: Interactive Exploration of Casually Captured Videos, ACM Trans. Graph. (Proc. SIGGRAPH) 29, Article 87, Issue 4, 11 pages, Jul. 2010.
Chaurasia, et al., Depth Synthesis and Local Warps for Plausible Image-based Navigation, ACM Trans Graph 32, 3, Article 30, 12 pages, Jun. 2013.
Chaurasia, et al., Silhouette-Aware Warping for Image-Based Rendering. Comput. Graph. Forum (Proc. EGSR)30, 4 (2011), pp. 1223-1232, 2011.
Chen, QuickTime VR—An Image-Based Approach to Virtual Environment Navigation, in ACM SIGGRAPH 1995 Conference Proceedings, pp. 29-38, 1995.
Chen, et al., View Interpolation for Image Synthesis, In ACM SIGGRAPH 1993 Conference Proceedings, pp. 279-288, 1993.
Fanello, et al., Low Compute and Fully Parallel Computer Vision with HashMatch, In the IEEE International Conference on Computer Vision (ICCV), pp. 1-11, 2017.
Gu, et al., Application of Motion Vector in Live 3D Object Reconstruction, PATTERNS 2011: The Third International Conferences on Pervasive Patterns and Applications, pp. 41-46, 2011.
Hedman, et al., Casual 3D Photography, ACM Transactions on Graphics, Article 234, 36(6):1-15, 2017.
Hedman, et al., Instant 3D Photography, ACM Transactions on Graphics, Article 101, 37(4):1-12, Aug. 2018.
Hirschmuller, et al., Memory Efficient Semi-Global Matching, ISPRS Annals of the Photogrammetry, Remote Sensing and Spatial Information Sciences, vol. I-3, 2012 XXII ISPRS Congress, Melbourne, Australia, pp. 371-376, Sep. 2012.
Hirschmuller, et al., Stereo Processing by Semiglobal Matching and Mutual Information, IEEE Transactions on Pattern Analysis and Machine Intelligence, 30(2):328-341, Feb. 2008.
Holynski, et al., Fast Depth Densification for Occlusion-aware Augmented Reality, ACM Transactions on Graphics, Article 194, 37(6): 1-11, Nov. 2018.
Hornung, et al., Interactive Pixel-Accurate Free Viewpoint Rendering from Images with Silhouette Aware Sampling, Computer Graphics, 0(1981): 1-13, 2009.
Kanade, et al., A Stereo Machine for Video-rate Dense Depth Mapping and Its New Applications, Proceedings of 15th Computer Vision and Pattern Recognition Conference (CVPR), San Francisco, pp. 1-7, Jun. 1996.
Kang, et al., Extracting View-Dependent Depth Maps from a Collection of Images, International Journal of Computer Vision 58(2):139-163, 2004.
Levin, et al., Colorization using Optimization, The Hebrew University of Jerusalem, ACM 0733-0301/04/01)00-0689, pp. 689-694, 2004.
Lipski, et al., Virtual Video Camera: Image-Based Viewpoint Navigation Through Space and Time, Computer Graphics, pp. 1-12, 2010.
Martino, et al., An Analysis and Implementation of Multigrid Poisson Solvers with Verified Linear Complexity, Image Processing on Line 8 (2018), pp. 192-218, 2018.
Matzen, et al., Low-Cost 360 Stereo Photography and Video Capture, ACM Transactions on Graphics, Article 148, 36(4): 1-13, Jul. 2017.
McMillan, et al., Plenoptic Modeling: An Image-Based Rendering System, Proceedings of SIGGRAPH 95, Los Angeles, California, pp. 1-8, Aug. 1995.
Nover, et al., ESPReSSo: Efficient Slanted PatchMatch for Real-time Spacetime Stereo, Google, pp. 1-9.
Perez, et al., Poisson Image Editing, Microsoft Research UK, CM 0730-0301 03 0700-0313, pp. 313-318, 2003.
Shum, et al., Image-Based Rendering, Springer Science Business Media, LLC, 213 pages, 2007.
Sinha, et al., Piecewise Planar Stereo for Image-based Rendering, Microsoft, pp. 1-8.
Stich, et al., View and Time Interpolation in Image Space, Pacific Graphics, 27(7):1-7, 2008.
Szeliski, Computer Vision: Algorithms and Applications, pp. 1-481, Aug. 5, 2010.
Szeliski, et al., Locally Adapted Hierarchical Basis Preconditioning, Microsoft Research, pp. 1-39, May 2006.
Valeniin, et al., Depth from Motion for Smartphone AR, CM Trans. Graph., Article 193, 37(6):1-19, Nov. 2018.
Vangorp, et al., Perception of Perspective Distortions in Image-Based Rendering, ACM Trans Graph, 32(4): 1-35, Jul. 2013.
Vangorp, et al., Perception of Visual Artifacts in Image-Based Rendering of Facades, Computer Graphics Forum, Wiley, Proceedings of the Eurographics Symposium on Rendering, 30(4): 1-11, Jul. 8, 2011.
Zitnick, et al., High-quality video view interpolation using a layered representation, ACM 073341301/04.42000.0700, pp. 600-608, 2004.
Zitnick, et al., Stereo for Image-Based Rendering using Image Over-Segmentation, Kluwer Academic Publishers, pp. 1-32, 2006.

\* cited by examiner

SYSTEMS, METHODS, AND MEDIA FOR VISUALIZING OCCLUDED PHYSICAL OBJECTS RECONSTRUCTED IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

Embodiments described herein cover systems, methods, and media configured to generate a visualization of passthrough imagery of the physical environment of a user. When a user is wearing an HMD, his vision of the physical world is occluded by the HMD. Using the HMD's external-facing cameras, a video of the physical world may be displayed to the user, thereby providing a "passthrough" effect. The captured video itself, however, is 2D, so if a virtual object is placed within the passthrough view, it would always occlude the passthrough video, even if the virtual object should be occluded by physical objects that are closer to the viewer.

One way to properly handle occlusion is to take into account the depths of physical objects. For example, a computing system may compute depth measurements of objects in the physical world and generate 3D models (e.g., a mesh) to represent the observed objects. Depth values may be ascertained, for example, by performing stereo-depth computations from two concurrently captured images. When rendering a scene that depicts a combination of reconstructed physical objects and virtual objects, the depth measurements of all those objects could be compared to determine occlusion. Having the occlusion determination depend strictly on relative depth would work if the depth measurements of the physical objects are accurate. But in practice, depth measurements, especially those computed based on stereo images or other passive depth-estimation techniques, are imprecise and noisy. Inaccuracies in the depth measurements, in turn, would negatively affect the correctness of the rendered occlusion effect.

Embodiments described herein focus on a visualization technique that would make occlusion inaccuracies less noticeable and more visually appealing. In particular embodiments, when rendering a scene that depicts a combination of reconstructed physical objects and virtual objects, depth measurements of the physical objects may be compared against known depth values of the virtual objects. If the difference in depth is sufficiently large, the rendering system could confidently rely on the relative depth between objects to determine occlusion, even if the depth measurements for the physical objects are inaccurate and noisy. However, if the difference in depth is not sufficiently large (e.g., within a predetermined threshold), there would be ambiguity in determining which objects should be in the foreground and which should be in the background. In such cases, the opacity or transparency value (referred to as "alpha") of those nearby objects could be made translucent to create a soft visual blending effect. For example, the alpha of a portion of a passthrough visual that is sufficiently close to a virtual object may be lowered so that the corresponding pixels would be a blend of the two. Creating a blending effect in places where occlusion cannot be precisely determined makes the visual presentation more pleasant and forgiving.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Artificial reality—especially virtual reality—is designed to provide users with an immersed experience separate from the real world. The immersive experience is attributable in part to the HMD providing simulated content and shielding the real world from the user's vision. However, while a user is immersed in artificial reality, there may be many moments when the user may want to see the real world. For example, the user may want to speak briefly to someone in the physical world, look for his mobile device, pick up a coffee mug, or see what attributed to a noise he heard. To do so, users of traditional HMD systems would need to at least temporarily remove the HMD. For systems that have controllers, the user may further need to put down at least one of the controllers in order to free up a hand to remove the HMD. These actions could significantly disrupt the user's immersive artificial-reality experience.

Particular embodiments described herein provide a user who is immersed in artificial reality the ability and option to quickly perceive his physical surroundings without having to remove the HMD. "Passthrough" is a feature that allows a user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, displaying the images with other virtual objects would present proper occlusion effects. Moreover, simply displaying the images would not provide the user with proper parallax effects if he were to shift away from where the images were taken. Thus, rather than simply displaying the captured images, the passthrough feature extracts information about the environment from the captured images (e.g., depth information), use the information to generate a 3D model of the environment, and reconstruct a scene of the modeled environment from the user's current viewpoint.

Figure 1:
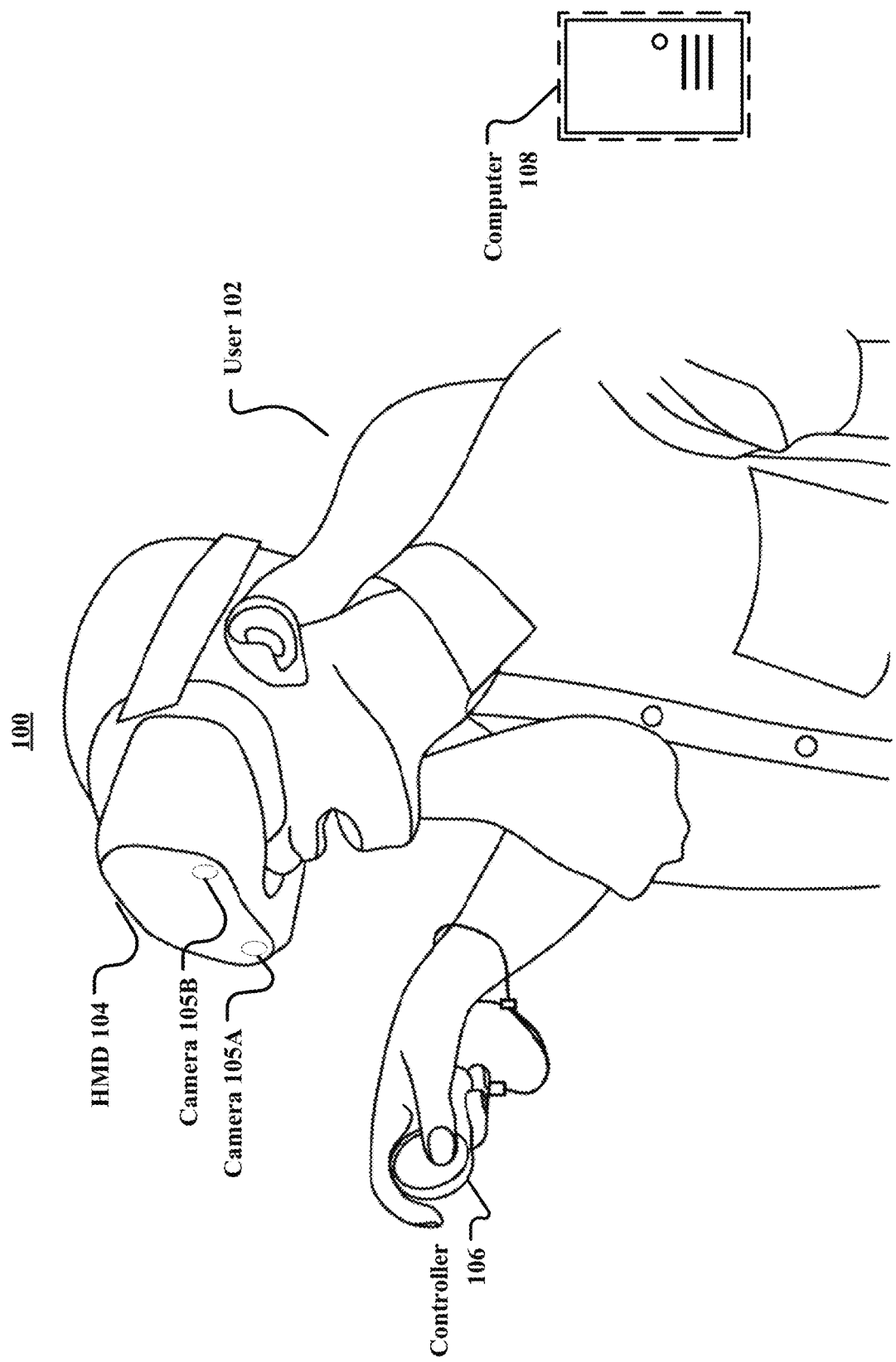
FIG. 1 illustrates an example of an artificial reality system worn by a user, in accordance with particular embodiments.

FIG. 1 illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

The HMD 104 may have external-facing cameras, such as the two forward-facing cameras 105A and 105B shown in FIG. 1. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 2:
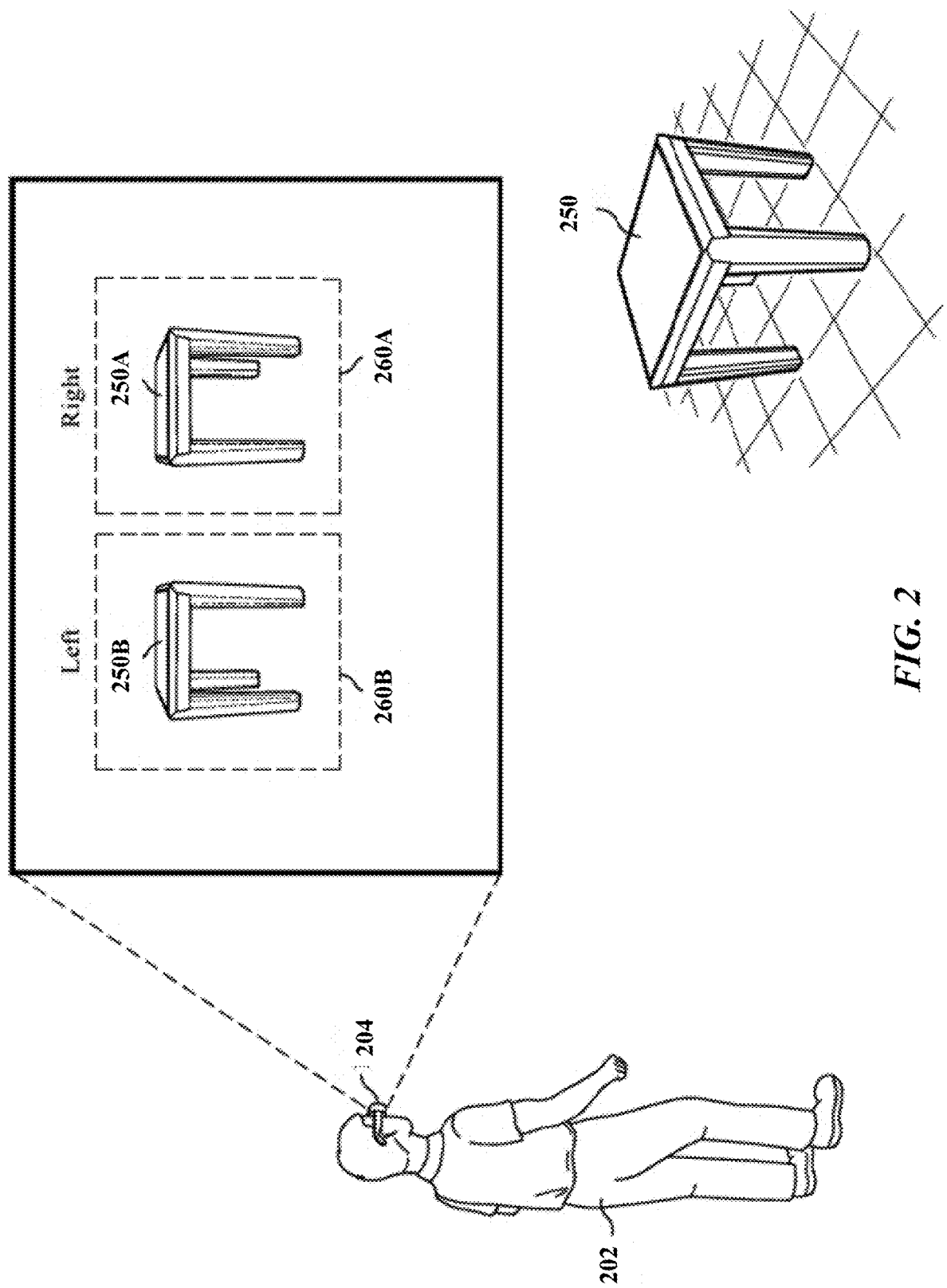
FIG. 2 illustrates an example of a passthrough feature, in accordance with particular embodiments.

FIG. 2 illustrates an example of the passthrough feature. A user 202 may be wearing an HMD 204, immersed within a virtual reality environment. A physical table 250 is in the physical environment surrounding the user 202. However, due to the HMD 204 blocking the vision of the user 202, the user 202 is unable to directly see the table 250. To help the user perceive his physical surroundings while wearing the HMD 204, the passthrough feature captures information about the physical environment using, for example, external-facing cameras of the HMD 204. The captured information may then be re-projected to the user 202 based on his viewpoints. In particular embodiments where the HMD 204 has a right display 260A for the user's right eye and a left display 260B for the user's left eye, the system 200 may individually render (1) a re-projected view 250A of the physical environment for the right display 260A based on a viewpoint of the user's right eye and (2) a re-projected view 250B of the physical environment for the left display 260B based on a viewpoint of the user's left eye.

The passthrough feature provides a perspective-accurate visualization of the user's surroundings by re-projecting the visual data captured by the external-facing cameras into the screen space of each eye of the user. At a high-level, the process for generating a passthrough visualization has two phases: generating a 3D model of the physical environment and rendering a passthrough visualization based on the 3D model. Through the external-facing cameras 105A-B of the HMD 104, a sequence of images of the surrounding physical environment may be captured. The information captured by the cameras 105A-B, however, would be misaligned with what the user's eyes would see since the cameras could not spatially coincide with the user's eyes (e.g., the cameras and the user's eyes have different viewpoints because they are located some distance away from each other). As such, simply displaying what the cameras captured to the user would not be an accurate representation of what the user should perceive. Thus, instead of simply displaying what was captured, the passthrough feature would re-project information captured by the external-facing cameras 105A-B to the user.

Figure 3:
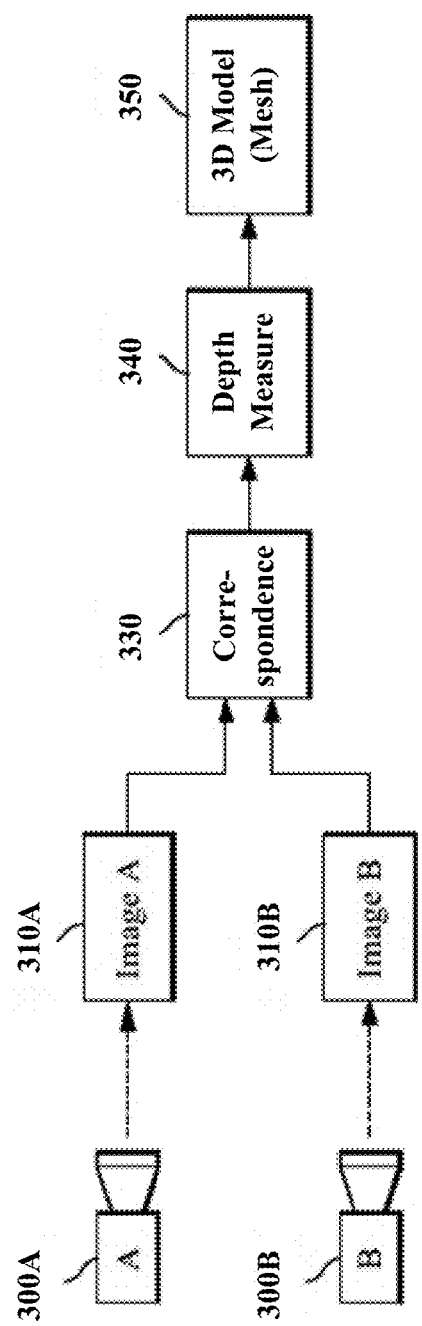
FIG. 3 illustrates an example process for modeling the physical environment surrounding the user, in accordance with particular embodiments.

FIG. 3 illustrates an example process for modeling the physical environment surrounding the user, in accordance with particular embodiments. Information about the physical environment may be captured using any suitable sensors. For example, FIG. 3 illustrates a pair of stereo cameras 300A and 300B that are a known distance apart and have a shared field of view. The stereo cameras 300A and 300B may simultaneously capture stereo images 310A and 310B, respectively. Each pair of simultaneously captured stereo images 310A-B may be used to estimate the depths of observed features. As explained above, to measure depth using triangulation, a computing unit would determine correspondences 330 between pixels of the stereo images 310A-B. For example, the computing unit would determine which two pixels in the pair of stereo images 310A-B correspond to the same observed feature. Based on the pixel correspondences 330, along with the known spatial relationship between the cameras 300A-B, the computing unit may use triangulation or other suitable techniques to estimate the depth 340 of the feature captured by the pixels. The depth measurements 340 of the observable features in the environment may then be used to construct a 3D model 350 to represent the physical environment.

A high-performance computing unit may solve the correspondence problem using a GPU and optical flow techniques, which are optimized for determining correspondences. The correspondence information may then be used to compute depths using triangulation techniques. Based on the computed depths of the observed features, the computing unit could determine where those features are located within a 3D space (since the computing unit also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras.

The process described above, however, may not be feasible for a resource-limited computing device (e.g., a mobile phone may be the main computational unit for the HMD). For example, unlike systems with powerful computational resources and ample energy sources, a mobile phone may not be able to rely on GPUs and computationally-expensive algorithms (e.g., optical flow) to perform depth measurements and generate an accurate 3D model of the environment. Thus, to provide passthrough on resource-limited devices, an optimized process is needed.

Resource-limited devices, such as mobile phones, may leverage video encoders to determine correspondences, in accordance with particular embodiments. A video encoder (hardware or software) is designed to be used for video compression. It is common on any computing device capable of capturing and displaying video, even resource-limited ones like mobile phones. The video encoder achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images 310A-B may be computed using a device's video encoder. Using an API provided for the device's video encoder, the computing unit tasked with generating the passthrough feature may instruct the video encoder to process the two stereo images 310A and 310B. However, since video encoders are designed to find correspondence between sequential frames captured at a high frame rate (e.g., 30, 60, 80, or 100 frames-per-second), which means that sequential frames are likely very similar, having the video encoder find correspondences between two simultaneously captured stereo images 310A-310B may yield suboptimal results. Thus, in particular embodiments, one or both of the images 310A-310B may undergo a translation based on the known physical separation between the two cameras 300A and 300B so that the images 310A and 310B would be more similar.

The output of the video encoder may be a motion vector that describes the predicted correspondences between images 310A and 310B using per-pixel offsets. The motion vector, however, could be noisy (i.e., many of the correspondences could be inaccurate). Thus, in particular embodiments, the motion vector may undergo one or more verification filters to identify the more reliable correspondence predictions. For example, one verification filter may use the known geometry of the cameras 300A and 300B to determine epipolar lines for each pixel. Using the epipolar line associated with each pixel, the computing device could determine whether the corresponding pixel as identified by the motion vector is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter may assess the reliability of a correspondence found by the motion vector based on temporal observations. This temporal filtering process may be applied to the original motion vector or only to a subset of the motion vector that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passed through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points. After the verification filtering process, the system would have a collection of stereo outputs or depth measurements.

In particular embodiments, the computing device may be configured to dynamically determine, at runtime, whether it is capable of or able to generate depth measurements using (1) the GPU and optical flow or (2) the video encoder and motion vectors. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Once the computing device has generated a point cloud based on the depth measurements, it may generate a 3D mesh representation of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. In particular embodiments, a single 3D mesh may be used to approximate all the objects observed. Conceptually, the 3D mesh is analogous to a blanket or sheet that covers the entire observable surfaces in the environment. In particular embodiments, the mesh may be initialized to be equal-distance (e.g., 1, 2, 2.5, or 3 meters) from a viewer or camera. Since the 3D mesh is equal-distance away from the viewer, it forms a hemisphere around the user. The 3D mesh may be deformed according to the depth measurements of the observed physical objects in order to model the contour of the environment. In particular embodiments, the 3D mesh may be deformed based on the viewer's position and a point-cloud representation of the depth measurements. To determine which portion of the 3D mesh corresponds to each point in the point cloud, the computing device may cast a conceptual ray from the viewer's position towards that point. Each ray would intersect with a primitive (e.g., a triangle or other polygon) of the 3D mesh. As a result, the point of intersection on the mesh is deformed based on the depth value associated with the point through which the ray was cast. For example, if the depth measurement of the point is 2.2 meters away from the viewer, the initial 2-meter depth value associated with the point of intersection on the mesh may be changed to 2.2 meters. Once this process has been completed for each point in the point cloud, the resulting deformed mesh would represent the contour of the physio) environment observed by the viewer.

Figure 4:
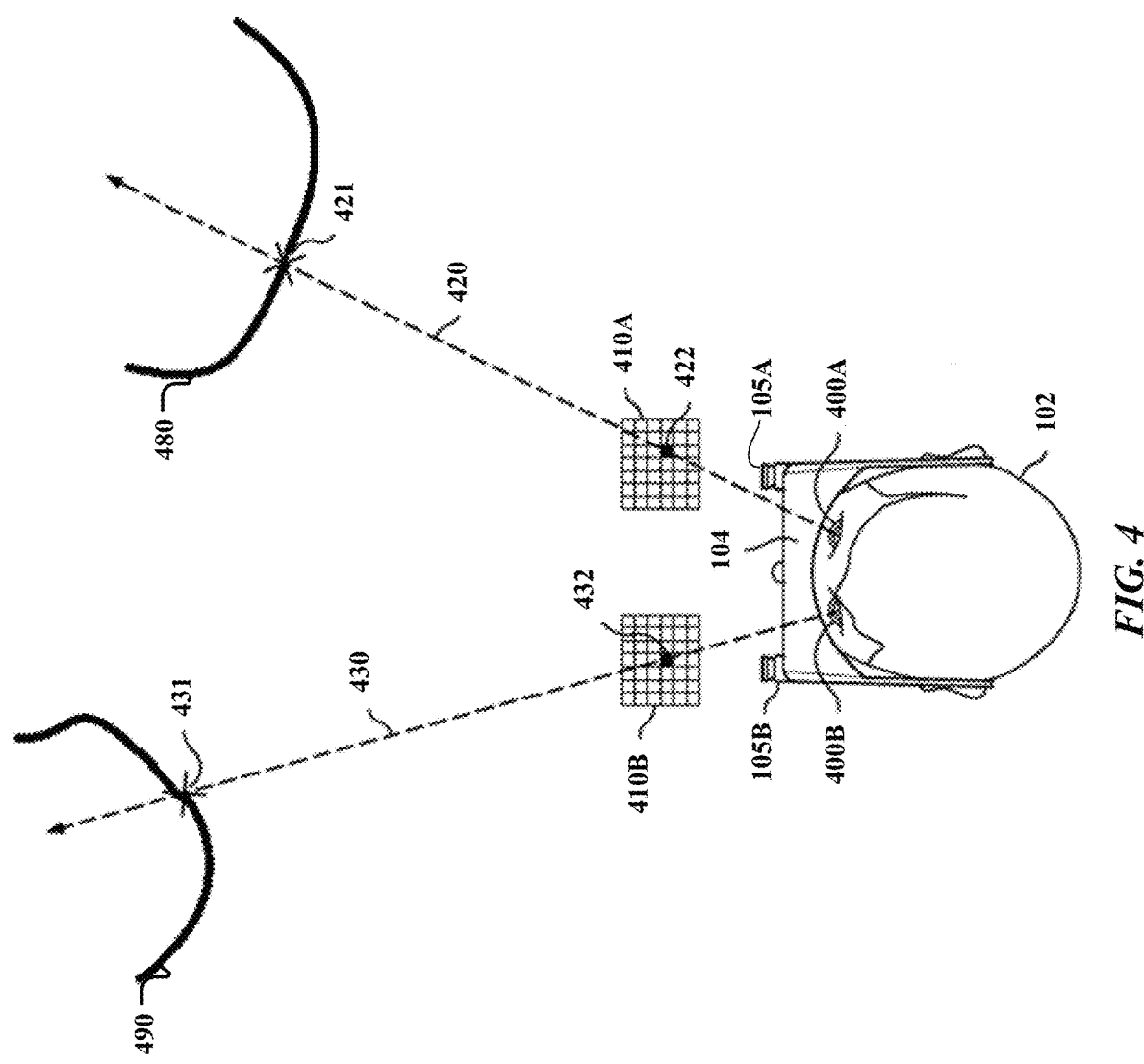
FIG. 4 provides an illustration of 3D-passthrough rendering based on a 3D model of the environment, in accordance with particular embodiments.

FIG. 4 provides an illustration of 3D-passthrough rendering based on a 3D model of the environment. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 400A and 400B using offsets from the pose of the HMD 104. The system may then render a passthrough image for each of the user's eyes 400A-B. For example, to render a passthrough image for the user's right eye 400A, the system may cast a ray 420 from the estimated viewpoint of the right eye 400A through each pixel of a virtual screen space 410A to see which portion of a 3D model would be intersected by the ray 420. This ray casting process may be referred to as a visibility test, as the objective is to determine what is visible from the selected viewpoint 400A. In the particular example shown, the ray 420 projected through a particular pixel 422 intersects with a particular point 421 on the 3D model 480. This indicates that the point of intersection 421 is to be displayed by the pixel 422. Once the point of intersection 421 is found, the rendering system may sample a corresponding point in a texture image that is mapped to the point of intersection 421. In particular embodiments, the image captured by the cameras 105A-B of the HMD 104 may be used to generate a texture for the 3D model 480. Doing so allows the rendered image to appear more like the actual physical object. In a similar manner, the rendering system may render a passthrough image for the user's left eye 400B. In the example shown, a ray 430 may be cast from the left-eye viewpoint 400B through pixel 432 of the left screen space 410B. The ray 430 intersects the 3D model 490 at location 431. The rendering system may then sample a texture image at a texture location corresponding to the location 431 on the model 490 and compute the appropriate color to be displayed by pixel 432. Since the passthrough images are re-rendered from the user's viewpoints 400A-B, the images would appear natural and provide proper parallax effect.

As explained, the 3D models of physical objects are based on depth measurements, which could be inaccurate and noisy. In addition, the manner in which the physical environment is modeled may be imprecise (e.g., a single-mesh representation of the general contour of all objects in the environment, described in further detail above). When a rendered scene includes only passthrough information, the inaccuracies of the 3D models may not cause noticeable visual issues. Even when a rendered scene includes both passthrough information and virtual objects, the accuracy issue of the 3D models might not cause any noticeable visual issue if the 3D models of physical objects and the virtual objects are sufficiently far apart. However, when the 3D models of physical objects are close to each other, then the inaccuracies could affect how occlusion is determined and introduce undesirable artifacts in the rendered scene.

Figure 5A:
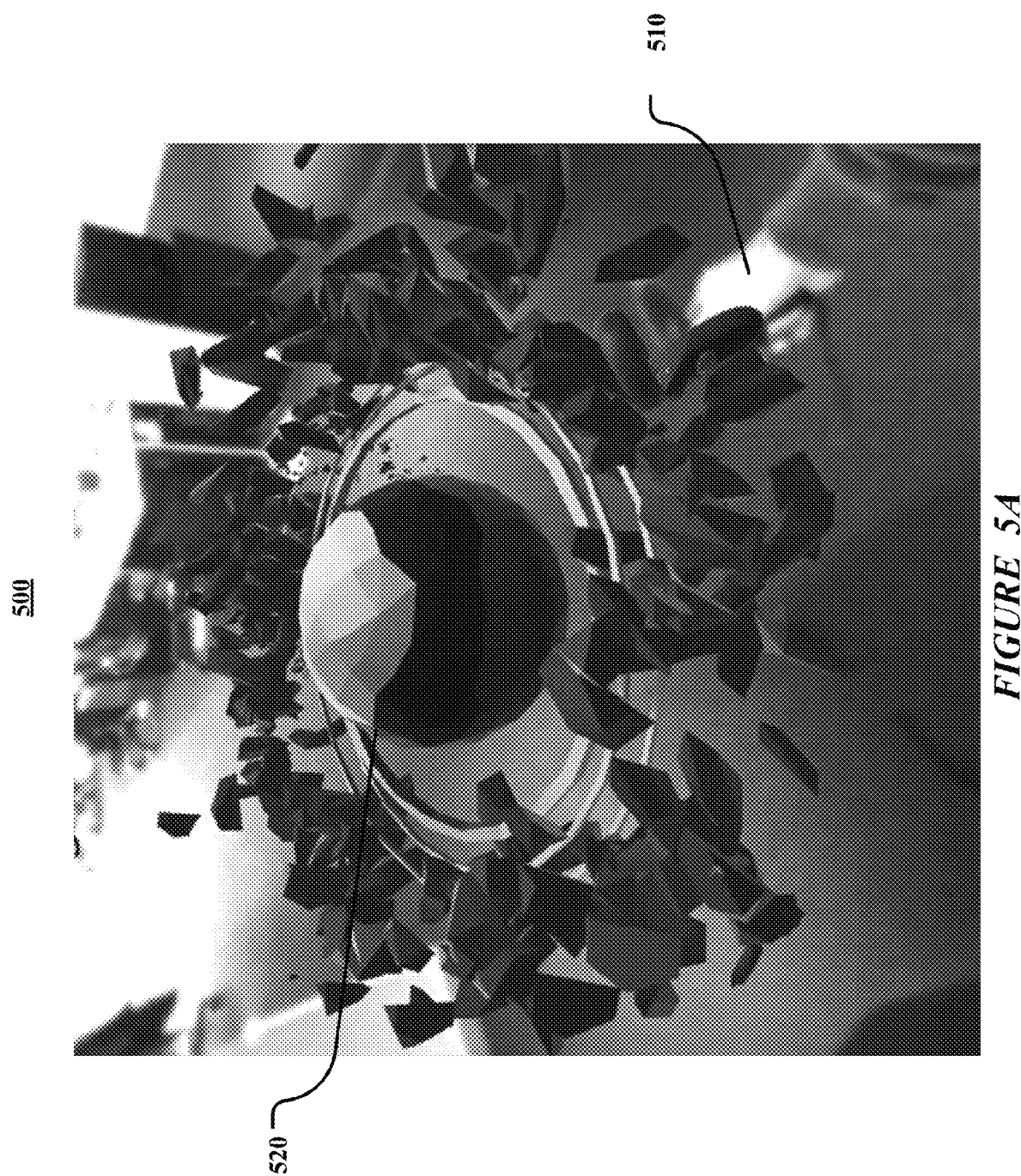
FIGS. 5A-5B illustrate an example of occlusion artifacts in a mixed-reality scene that includes passthrough and virtual objects, in accordance with particular embodiments.
Figure 5B:

FIGS. 5A-5B illustrate an example of occlusion artifacts in a mixed-reality scene that includes passthrough and virtual objects, in accordance with particular embodiments. In these examples, the occlusion effect in the scenes are rendered according to traditional rendering logic—objects that are closer to the viewer occlude objects that are farther. FIG. 5A illustrates a rendered scene 500 that includes passthrough information reflecting the physical environment surrounding the user, which includes a passthrough visual of the controller held by the user's right hand 510 (collectively referred to as the user's hand). As previously explained, in particular embodiments, the passthrough visual of the user's hand 510 may be rendered based on a corresponding 3D model generated using estimated depth measurements. Since the estimated depth measurements could be inaccurate, the 3D model could also be inaccurate. Moreover, the manner in which the environment is modeled could also introduce imprecision. For example, if the contour of the environment is modeled using a single mesh, certain portions of the mesh may not be defined based on actual depth measurements. Rather, the depths of those portions of the mesh could be the result of interpolation or smoothing techniques. For example, since the floor has few trackable features from which to generate depth measurements, the depth measurements of the floor could be sparse. Thus, the mesh representation of the contour of the environment could extend from the depth measurements of the user's hand 510 to the depth measurements of the sparse points on the floor, analogous to a blanket being thrown over the user's hand 510 and falling on the floor in the background.

Scene 500 also includes several virtual objects, such as the globe 520. In this example, the hand 510 and the globe 520 are far apart in screen space (i.e., the x-y plane of scene 500). For the pixels displaying the globe 520, the rendering system correctly determined that the globe 520 is the closest object to the viewer and, therefore, should occlude the floor in the background. Even though the 3D model is inaccurate between the floor and the user's hand 510, that portion of the model is sufficiently far from the globe 520 to not introduce any occlusion error.

FIG. 5B illustrates an example of a scene 501 where the user's hand 510 moved closer to the globe 520. Now that the hand 510 and the globe 520 overlap in screen space, the rendering system determined that the hand 510 is closer to the viewer and should occlude a portion of the globe 520. However, in addition to the visual portion of the hand 510, a surrounding portion of the floor 530 is shown to occlude the globe 520, which is incorrect. This particular error is due to the inaccuracies in the 3D model representing the environment. In this particular example, the 3D model is a mesh that extends from the user's hand 510 to the floor. As such, the mesh corresponding to the portion of the floor 530 has interpolated depth values that are fairly close to that of the hand 510, even though the true depth of the floor should be farther than the globe 520. Based on the inaccurate mesh, the rendering system determined that the portion of the floor 530 should occlude the globe 520, resulting in the unnatural and excessive occlusion effect.

Figure 6A:
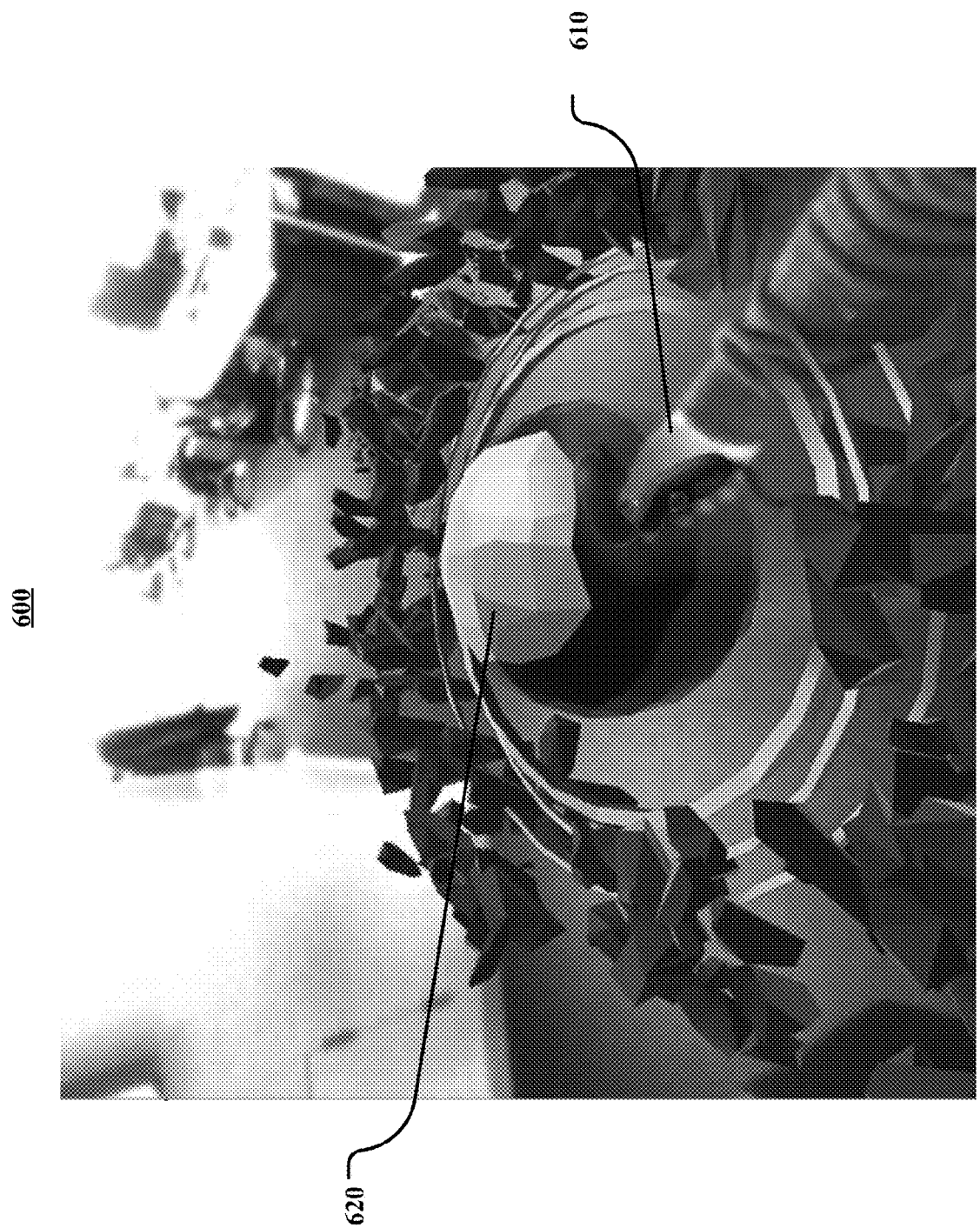
FIGS. 6A-6B illustrate an example of improved occlusion rendering in a mixed-reality scene that includes passthrough and virtual objects, in accordance with particular embodiments.
Figure 6B:
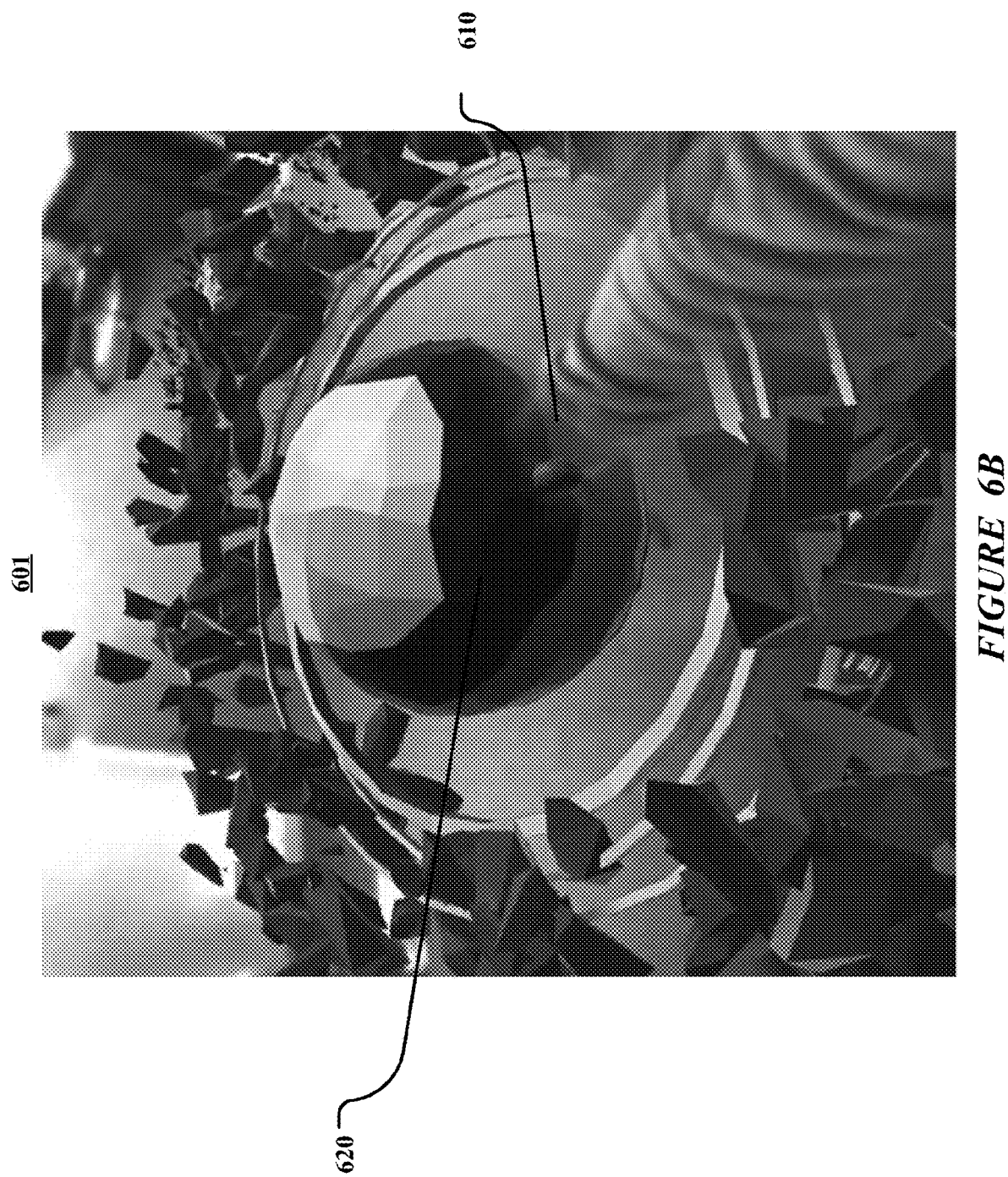

FIGS. 6A-6B illustrate an example of improved occlusion rendering in a mixed-reality scene that includes passthrough and virtual objects, in accordance with particular embodiments. FIG. 6A illustrates a rendered scene 600 that depicts a passthrough visual of a user's hand 610 and a virtual globe 620 overlapping in screen space, similar to the situation shown in FIG. 5B. However, the scene 600 in FIG. 6A does not have the sharp, unnatural occlusion artifact 530 shown in FIG. 5B. Instead, the region around where the hand 610 overlaps with the globe 620 appears blurred. The blurring effect is suitable in this situation because the relative depth between the hand 610 and the globe 620 is within a threshold distance that is difficult to disambiguate without more precise depth measurements. The ambiguity stems from the lack of precise depth measurements and/or 3D modeling. Blending the hand 610 with the globe 620 results in a softer, more visually appealing representation of the mixed-reality scene.

FIG. 6B illustrates a rendered scene 601 where the user's hand 610 extends into the globe 620 (i.e., the hand 610 is behind the visible surface of the globe 620). In this example, the user's hand 610 is no longer visible, as it is occluded by the globe 620. This is because the hand 610 has extended far enough behind the globe 620 that the relative depth between the two is no longer within the aforementioned threshold distance. In other words, the relative depth is so great that there is no longer ambiguity with respect to the two objects' relative position. As a result, the rendering system, in particular embodiments, rendered the globe 620 to be in front, occluding the passthrough visual of the user's hand 610.

FIGS. 7A-7D illustrate an improved rendering logic for handling ambiguous occlusions between virtual objects and reconstructed physical objects, in accordance with particular embodiments. The figures illustrate different relative positions between a sphere 740 (an example of a virtual object) and a reconstructed model of a person 750 (an example of a reconstructed physical object used for passthrough rendering). The figures further show a camera 710, which represents a viewpoint from which a scene is being rendered, and a corresponding pixel screen space 730. In each of the figures, a ray 720 is projected from the camera 710 through a particular pixel 735 in screen space 730 to determine what objects in the scene are within the light of slight through the pixel 735. The points of intersections with the objects could be used by the rendering system to determine how occlusion should be rendered between the objects.

Figure 7A:
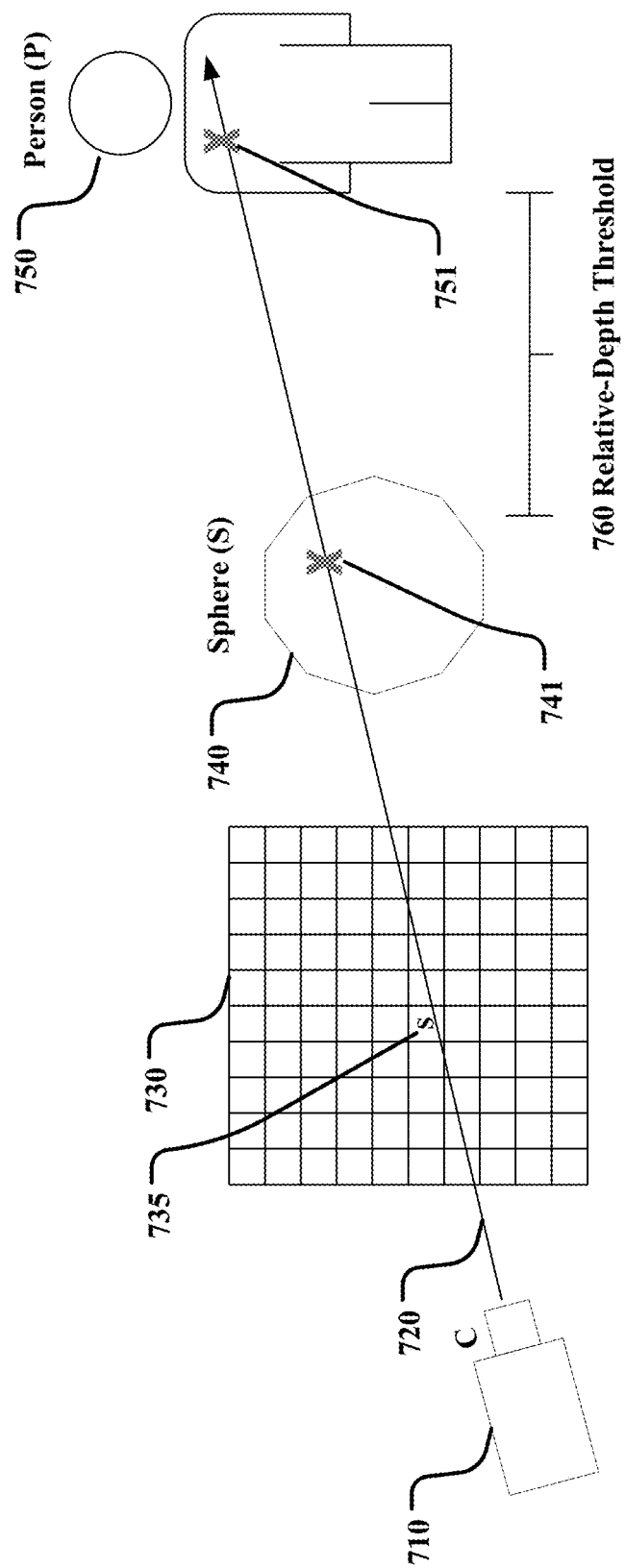
FIGS. 7A-7D illustrate an improved rendering logic for handling ambiguous occlusions between virtual objects and reconstructed physical objects, in accordance with particular embodiments.

FIG. 7A illustrates an example where the sphere 740 and the person 750 are far apart, with the sphere 740 being in front of the person 750 relative to the viewpoint of the camera 710. The ray 720 from the camera 710 projects through a particular pixel 735 in screen space 730 and intersects the sphere 740 at point 741 and the person 750 at point 751. In this example, the relative depth between points of intersection 741 and 751 as measured from the viewpoint of the camera 710 is more than a threshold 760 (e.g., 5, 7, 10, or 20 centimeters). The threshold 760 reflects the amount of confidence in the reconstructed model (e.g., the model of the person 750). A more accurate model-generation process allows the threshold 760 distance to be smaller since there is more confidence in the model's representation of the physical environment. Conversely, a less accurate model-generation process may warrant a larger threshold 760 distance, since there is less confidence and ambiguity in the model's representation of the physical environment. In scenarios like the one shown where the points of intersection 741 and 751 are more than the threshold distance apart, the rendering system could be confident that the point 741 on the sphere 740 is closer to the camera 710 than the point 751 on the person 750. In other words, the system could conclude that the point 751 on the person 750 is occluded by the point 741 on the sphere 740. As such, the pixel 735 may be rendered (or shaded) based on the point 741 on the sphere without regard to the point 751 on the person 750. This is represented in FIG. 7A by the 'S' character in pixel 735, representing that the pixel 735 is to be shaded based on the sphere 740.

Figure 7B:
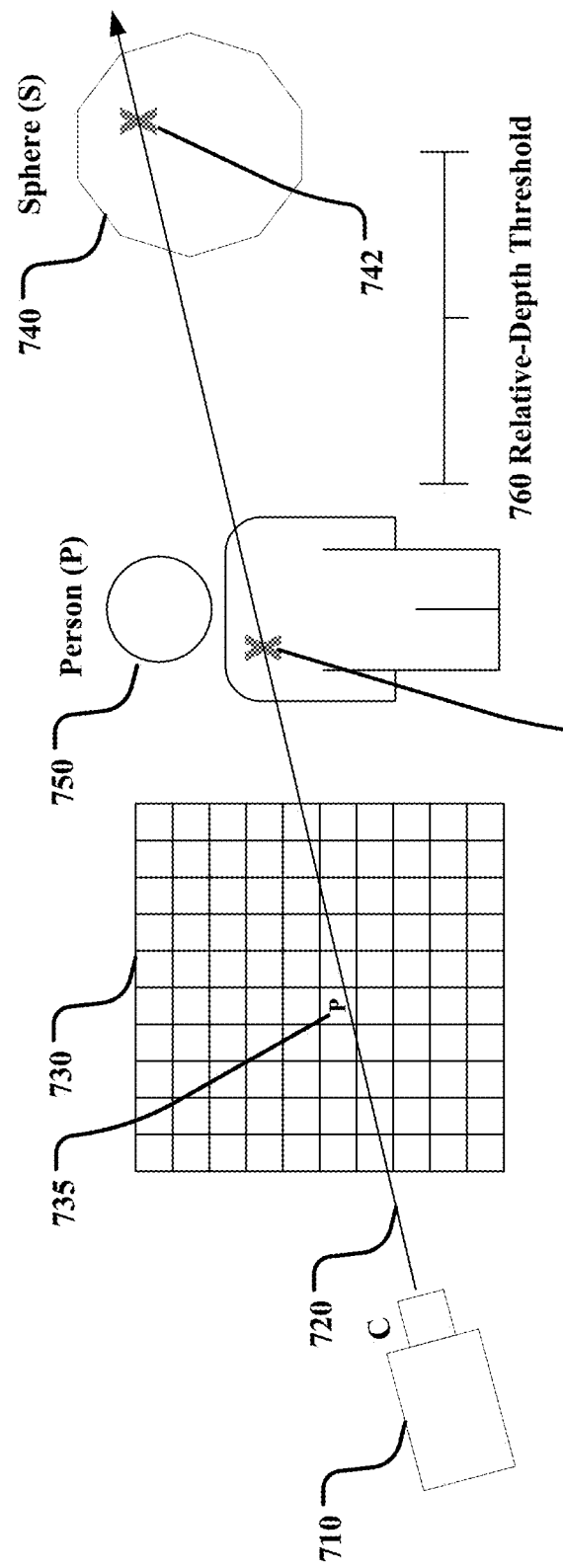

FIG. 7B illustrates an example where the sphere 740 and the person 750 are far apart, but this time the person 750 is in front of the sphere 740 relative to the viewpoint of the camera 710. The ray 720 from the camera 710 projects through a particular pixel 735 in screen space 730 and intersects the sphere 740 at point 742 and the person 750 at point 752. In this example, the relative depth between points of intersection 742 and 752 as measured from the viewpoint of the camera 710 is more than a threshold 760. In scenarios like the one shown where the points of intersection 742 and 752 are more than the threshold distance apart, the rendering system could be confident that the point 752 on the person 750 is closer to the camera 710 than the point 742 on the sphere 740. In other words, the system could conclude that the point 742 on the sphere 740 is occluded by the point 752 on the person 750. As such, the pixel 735 may be rendered (or shaded) based on the point 752 on the person 750 without regard to the point 742 on the sphere 740. This is represented in FIG. 7B by the 'P' character in pixel 735, representing that the pixel 735 is to be shaded based on the person 750.

Figure 7C:
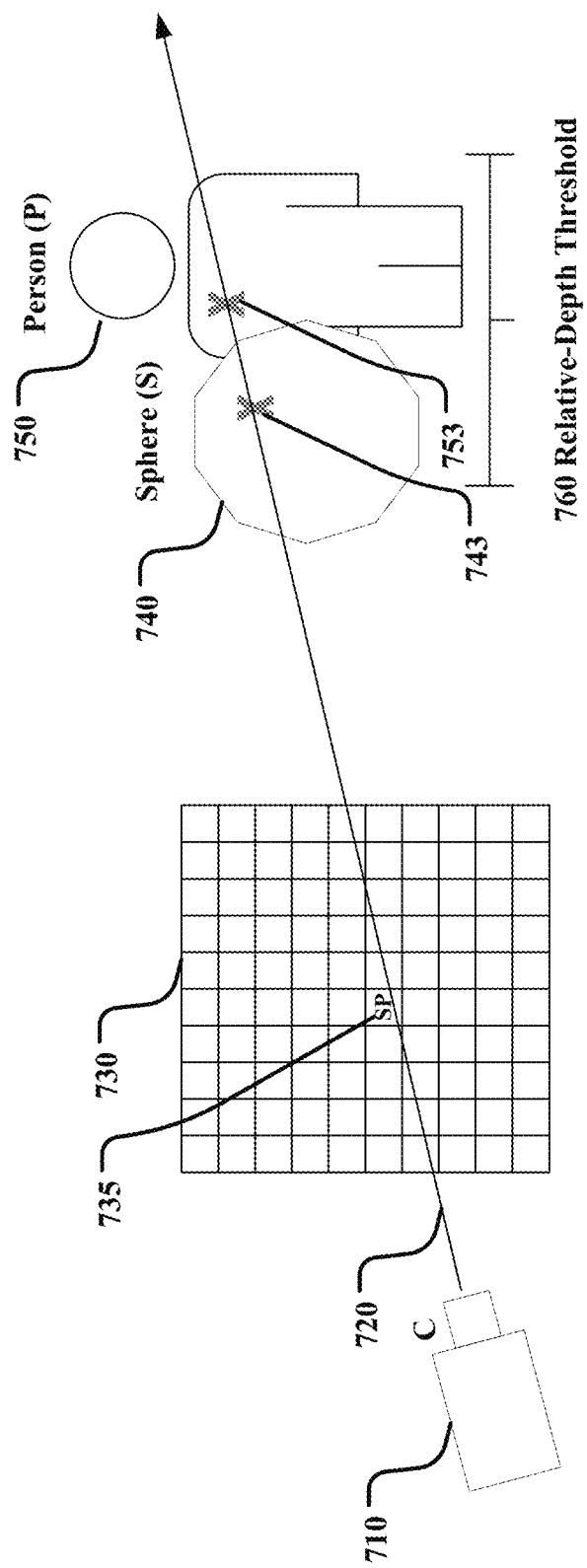

FIG. 7C illustrates an example where the sphere 740 and the person 750 are close together. The ray 720 from the camera 710 projects through a particular pixel 735 in screen space 730 and intersects the sphere 740 at point 743 and the person 750 at point 753. In this example, the relative depth between points of intersection 743 and 753 as measured from the viewpoint of the camera 710 is within the threshold distance 760. In this case, there is an ambiguity about which point is actually in front, since the reconstructed model of the person 750 could be inaccurate and noisy (the location and depth information of the sphere 740 is much more precise, as it is defined by the application and not based on estimations). Since the rendering system lacks confidence about the relative depth between the two points 743 and 753, the rendering system, in this case, may blend the color contributions of both points 743 and 753 to determine the color value for pixel 735. This is represented in FIG. 7C by the 'SP' characters in pixel 735, representing that the pixel 735 is to be shaded based on both the sphere 740 and the person 750.

Figure 7D:
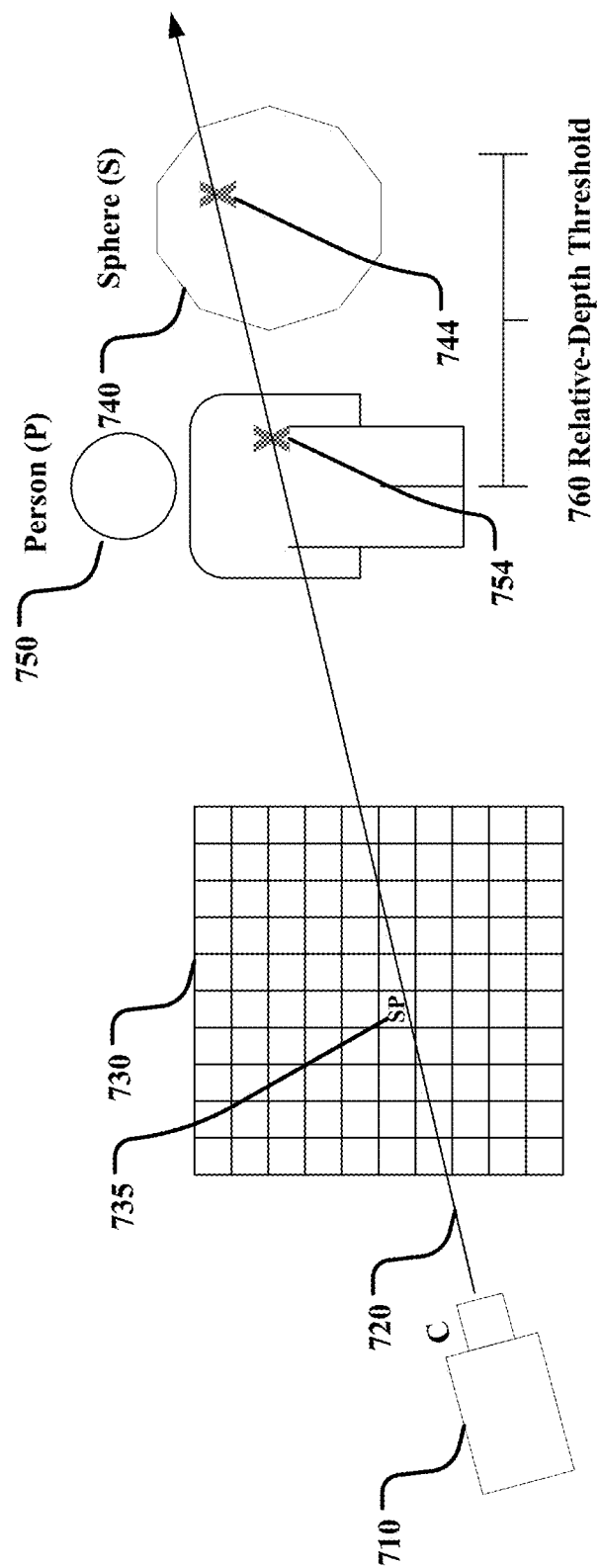

FIG. 7D illustrates an example where the sphere 740 and the person 750 are close to one another, but this time the person 750 is in front of the sphere 740 relative to the viewpoint of the camera 710. The ray 720 from the camera 710 projects through a particular pixel 735 in screen space 730 and intersects the sphere 740 at point 744 and the person 750 at point 754. In this example, the relative depth between points of intersection 744 and 754 as measured from the viewpoint of the camera 710 is within the threshold distance 760. In this case, there is an ambiguity about which point is actually in front. Since the rendering system lacks confidence about the relative depth between the two points 744 and 754, the rendering system may blend the color contributions of both points 744 and 754 to determine the color value for pixel 735. This is represented in FIG. 7D by the 'SP' characters in pixel 735, representing that the pixel 735 is to be shaded based on both the sphere 740 and the person 750.

The manner in which blending takes place may differ between embodiments. In particular embodiments, if the relative depth between a reconstructed object and a virtual object (or another reconstructed object) is between a threshold distance, then the alpha value of the color contribution of one or both of the objects could be used to generate the blended, composite pixel value. In particular embodiments, only the alpha of the passthrough object is contingent upon the relative distance between the objects; the virtual object's alpha would remain completely opaque regardless of the relative distance. Such a configuration of the rendering logic would result in a bias in favor of the virtual object, as the passthrough rendering of the reconstructed physical object is the one that fades out due to occlusion ambiguities. In other embodiments, the virtual object could be the only one that fades out, not the reconstructed object. In other words, the alpha of the virtual object, not the reconstructed object, is dependent on the relative distance between the objects. In particular embodiments, either the virtual object or the reconstructed object could fade out, depending on which is deemed closer to the viewer. For example, the bias could be in favor of the object that is closer to the viewer. For example, in the situation shown in FIG. 7C, the alpha of the person 750 may be made translucent and the sphere 740 may remain opaque since the person 750 is farther away. In the situation shown in FIG. 7D, the alpha of the sphere 740 may be made translucent and the person 750 may remain opaque since the sphere 740 is farther away. In other embodiments, the fading bias may be in favor of the object that is farther from the viewer. In further embodiments, both the alphas of the objects may be made translucent.

Figure 8:
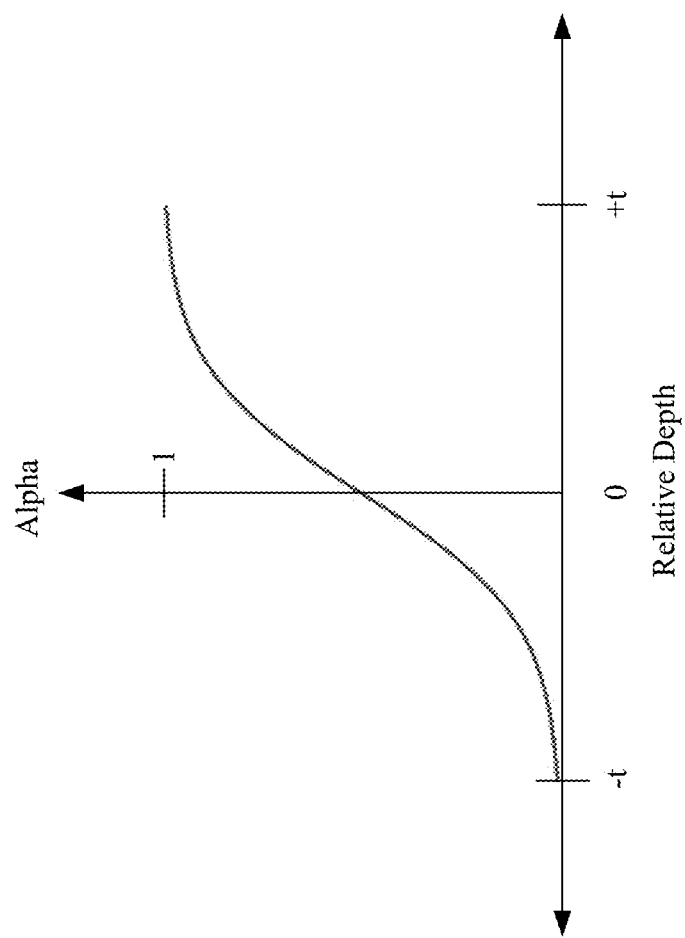
FIG. 8 illustrates an example that shows the relationship between transparency values (alpha blending) and relative depth, in accordance with particular embodiments.

FIG. 8 illustrates an example graph that shows the relationship between the level of alpha blending and relative depth, in accordance with particular embodiments. In this example, the alpha value of, for example, the reconstructed object would be 0.5 if it is located at the same place as another object (i.e., the relative depth is 0). If the reconstructed object is closer to the viewer and the relative depth approaches the +t threshold, the alpha of the reconstructed object would approach 1 (i.e., full opacity). If the reconstructed object is farther to the viewer than the other object, then as the relative depth approaches the −t threshold, the alpha of the reconstructed object would approach 0 (i.e., full transparency). It should be understood that the illustrated relationship between alpha and relative depth provides only one example. The relationship may be defined in any other suitable manner (e.g., the relationship could be linear as well).

Figure 9:
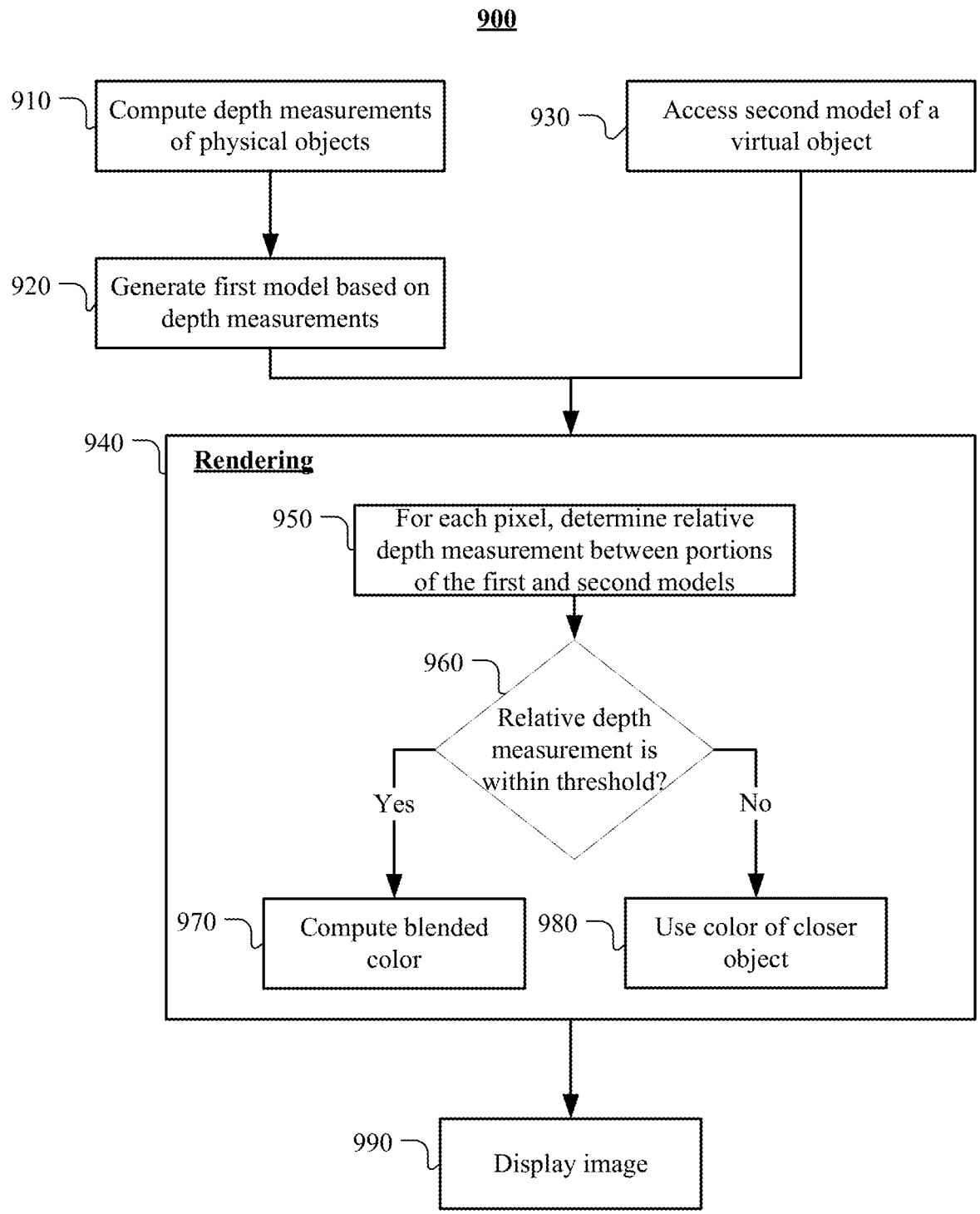
FIG. 9 illustrates an example method for providing a passthrough feature, in accordance with particular embodiments.

FIG. 9 illustrates an example method 900 for providing a passthrough feature, in accordance with particular embodiments. The method may begin at step 910, where a computing system may compute estimated depth measurements of at least one physical object in a physical environment surrounding a user. The estimated depth measurements may be based on sensor data, such as stereo images, an image capturing a scene of the physical environment with a structured light pattern projected over it, time-of-flight data (e.g., from a LiDAR), or any other suitable depth measurement systems. At step 920, the system may generate, based on the estimated depth measurements, a first model of the at least one physical object in the environment. The first model may be, for example, a collection of interconnected geometries (e.g., triangles or polygons) or mesh. At step 930, the computing system may access a second model of a virtual object. For example, the second model may be defined by a collection of geometries and a corresponding texture image.

At step 940, the system may render, based on at least the first model and the second model, an image depicting at least the physical object and the virtual object from a perspective of the user. As part of the rendering process, the system may perform visibility tests to determine, for each pixel, what portions of the first and second models are visible, if at all. For example, for a given pixel, the system may cast a ray into a 3D space in which the models are defined to determine which portions of those models are visible to that pixel. The visible portions, for example, may be primitives (e.g., triangle) used to form the geometry of the model.

At step 950, the system may determine, for each pixel, a relative depth measurement between (1) a portion of the first model and (2) a portion of the second model. Then at step 960, the system may determine whether the relative depth measurement is within a predetermined threshold. If the relative depth measurement is within the threshold, then at step 970, the system may compute, for the pixel, a blended color based on the portion of the first model and the portion of the second model. The resulting blended color for the pixel would correspond to a portion of the physical object and a portion of the virtual object. The pixel may be assigned the blended color regardless of which of the models is closer to the perspective of the user from which the image is rendered, so long as the relative depth measurement is within the threshold. For example, the portion of the first model corresponding to the portion of the physical object may be closer to the perspective of the user than the portion of the second model corresponding to the portion of the virtual object. As another example, the portion of the second model corresponding to the portion of the virtual object is closer to the perspective of the user than the portion of the first model corresponding to the portion of the physical object. In either case, the blended color is used for the pixel. The blended color may be computed in any suitable manner. For example, in response to the determination that the relative depth measurement is within the predetermined threshold, the system may set a color associated with the portion of the first model to have a translucency value (or alpha value). In particular embodiments, the translucency value may depend on a magnitude of the relative depth measurement (e.g., as shown in FIG. 8). In particular embodiments, color contributions from both the physical object and the virtual object may be assigned transparency values. For example, in response to the determination that the relative depth measurement is within the predetermined threshold, the system may further set a second color associated with the portion of the second model to have a second translucency value.

On the other hand, if the relative depth measurement is not within the threshold, then at step 980, the system may compute the color for the pixel based on whichever object is closer to the perspective of the user. For example, the color for the pixel may be computed based on a portion of the first model of the physical object if it is determined that the portion of the first model is closer to the perspective of the user than a portion of the second model of the virtual object.

As another example, the color for the pixel may be computed based on a portion of the second model of the virtual object if it is determined that the portion of the second model is closer to the perspective of the user than a portion of the first model of the physical object. The rendering process 940 may continue in the manner illustrated until each pixel in the image has a color. Some of the pixels may have blended colors, some may have colors computed based only on the first model of the physical object, and some may have colors computed based on only the second model of the virtual object.

At step 990, the system may display the rendered image to the user. In particular embodiments, the computing system may be associated with a head-mounted device that blocks the user from seeing the physical environment directly. The device may have two displays, one for each eye. If so, the perspective of the user for which the image is rendered may correspond to either eye of the user. Depending on which eye the image is rendered for, the rendered image may be displayed on the corresponding display configured to be viewed by that eye of the user.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating 3D passthrough, including the particular steps of the method of FIG. 9, this disclosure contemplates any suitable method for generating 3D passthrough, including any suitable steps, which may include a subset of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
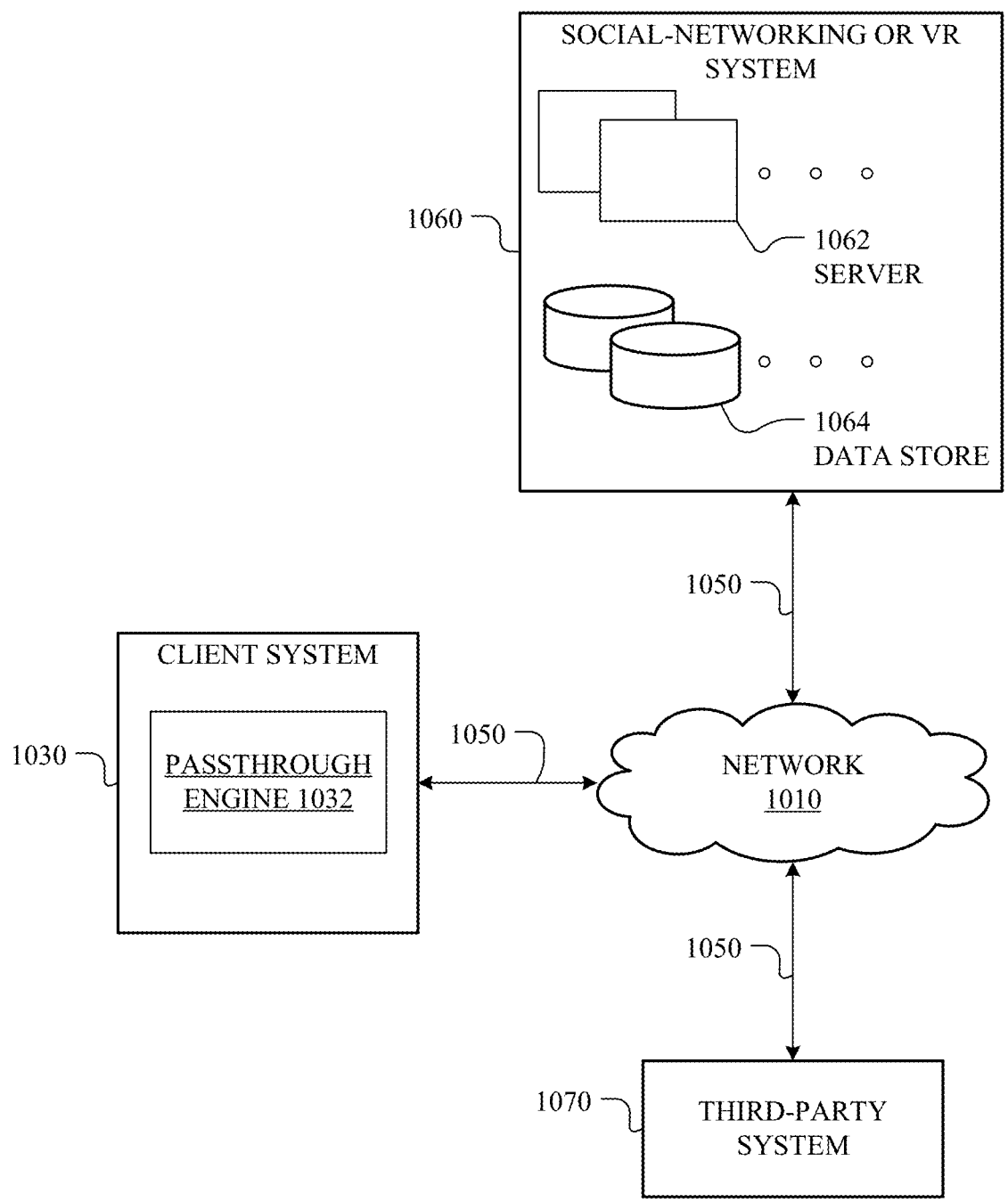
FIG. 10 illustrates an example network environment associated with a VR or social-networking system.

FIG. 10 illustrates an example network environment 1000 associated with a VR or social-networking system. Network environment 1000 includes a client system 1030, a VR or social-networking system 1060, and a third-party system 1070 connected to each other by a network 1010. Although FIG. 10 illustrates a particular arrangement of client system 1030, VR or social-networking system 1060, third-party system 1070, and network 1010, this disclosure contemplates any suitable arrangement of client system 1030, VR or social-networking system 1060, third-party system 1070, and network 1010. As an example and not by way of limitation, two or more of client system 1030, VR or social-networking system 1060, and third-party system 1070 may be connected to each other directly, bypassing network 1010. As another example, two or more of client system 1030, VR or social-networking system 1060, and third-party system 1070 may be physically or logically co-located with each other in whole or in part. Moreover, although FIG. 10 illustrates a particular number of client systems 1030, VR or social-networking systems 1060, third-party systems 1070, and networks 1010, this disclosure contemplates any suitable number of client systems 1030, VR or social-networking systems 1060, third-party systems 1070, and networks 1010. As an example and not by way of limitation, network environment 1000 may include multiple client system 1030, VR or social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 (e.g., an HMD) may include a passthrough engine 1032 to provide the passthrough feature described herein, and may have one or more add-ons, plug-ins, or other extensions. A user at client system 1030 may connect to a particular server (such as server 1062, or a server associated with a third-party system 1070). The server may accept the request and communicate with the client system 1030.

In particular embodiments, VR or social-networking system 1060 may be a network-addressable computing system that can host an online Virtual Reality environment or social network. VR or social-networking system 1060 may generate, store, receive, and send social-networking data, such as, for example, user-profile data, concept-profile data, social-graph information, or other suitable data related to the online social network. Social-networking or VR system 1060 may be accessed by the other components of network environment 1000 either directly or via network 1010. As an example and not by way of limitation, client system 1030 may access social-networking or VR system 1060 using a web browser, or a native application associated with social-networking or VR system 1060 (e.g., a mobile social-networking application, a messaging application, another suitable application, or any combination thereof) either directly or via network 1010. In particular embodiments, social-networking or VR system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking or VR system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking or VR system 1060, or a third-party system 1070 to manage, retrieve, modify, add, or delete, the information stored in data store 1064.

In particular embodiments, social-networking or VR system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1060 may provide users of the online social network the ability to communicate and interact with other users. In particular embodiments, users may join the online social network via social-networking or VR system 1060 and then add connections (e.g., relationships) to a number of other users of social-networking or VR system 1060 to whom they want to be connected. Herein, the term "friend" may refer to any other user of social-networking or VR system 1060 with whom a user has formed a connection, association, or relationship via social-networking or VR system 1060.

In particular embodiments, social-networking or VR system 1060 may provide users with the ability to take actions on various types of items or objects, supported by social-networking or VR system 1060. As an example and not by way of limitation, the items and objects may include groups or social networks to which users of social-networking or VR system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 1060 or by an external system of third-party system 1070, which is separate from social-networking or VR system 1060 and coupled to social-networking or VR system 1060 via a network 1010.

In particular embodiments, social-networking or VR system 1060 may be capable of linking a variety of entities. As an example and not by way of limitation, social-networking or VR system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking or VR system 1060. In particular embodiments, however, social-networking or VR system 1060 and third-party systems 1070 may operate in conjunction with each other to provide social-networking services to users of social-networking or VR system 1060 or third-party systems 1070. In this sense, social-networking or VR system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1060 also includes user-generated content objects, which may enhance a user's interactions with social-networking or VR system 1060. User-generated content may include anything a user can add, upload, send, or "post" to social-networking or VR system 1060. As an example and not by way of limitation, a user communicates posts to social-networking or VR system 1060 from a client system 1030. Posts may include data such as status updates or other textual data, location information, photos, videos, links, music or other similar data or media. Content may also be added to social-networking or VR system 1060 by a third-party through a "communication channel," such as a newsfeed or stream.

In particular embodiments, social-networking or VR system 1060 may include a variety of servers, sub-systems, programs, modules, logs, and data stores. In particular embodiments, social-networking or VR system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 1060 may also include suitable components such as network interfaces, security mechanisms, load balancers, failover servers, management-and-network-operations consoles, other suitable components, or any suitable combination thereof. In particular embodiments, social-networking or VR system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1060 to one or more client systems 1030 or one or more third-party system 1070 via network 1010. The web server may include a mail server or other messaging functionality for receiving and routing messages between social-networking or VR system 1060 and one or more client systems 1030. An API-request server may allow a third-party system 1070 to access information from social-networking or VR system 1060 by calling one or more APIs. An action logger may be used to receive communications from a web server about a user's actions on or off social-networking or VR system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking or VR system 1060. A privacy setting of a user determines how particular information associated with a user can be shared. The authorization server may allow users to opt in to or opt out of having their actions logged by social-networking or VR system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
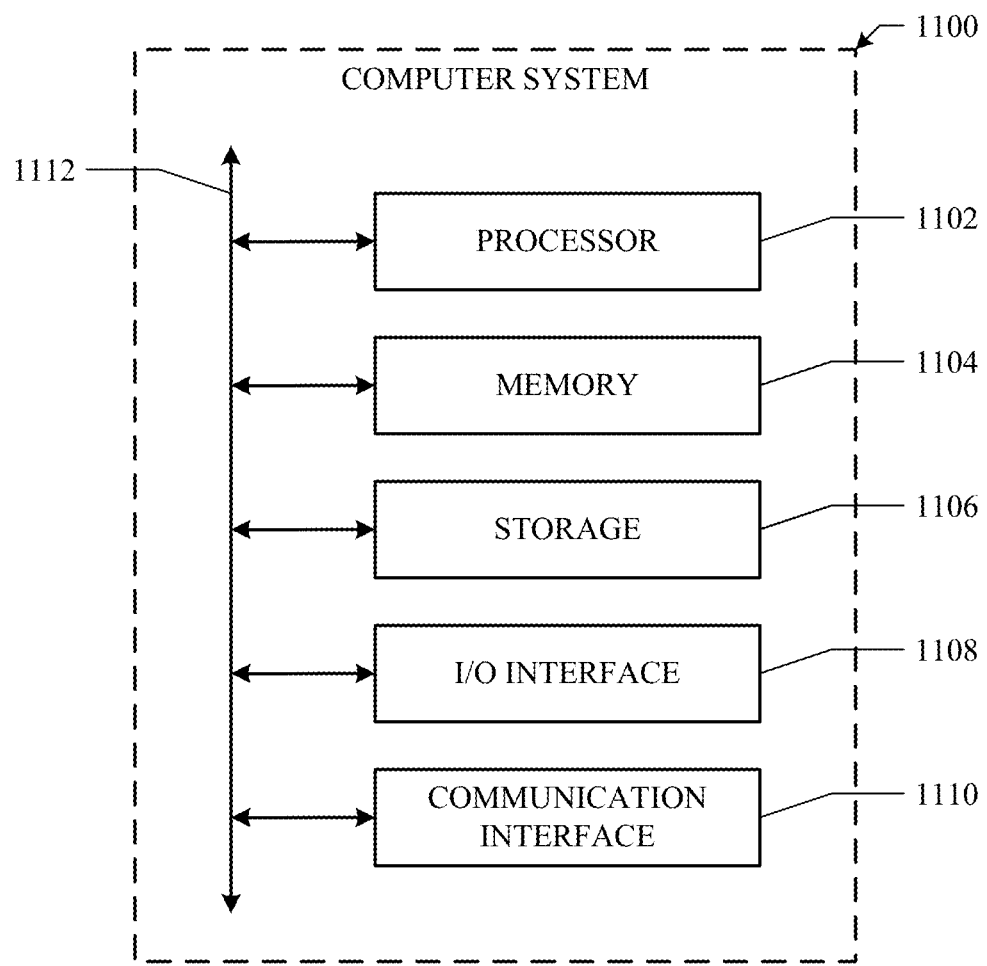
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   computing, based on sensor data, estimated depth measurements of at least one physical object in a physical environment surrounding a user;
   generating, based on the estimated depth measurements, a first model of the at least one physical object;
   accessing a second model of a virtual object;
   casting a ray from a virtual camera through a particular pixel in screen space;
   determining a first point of intersection of the casted ray at a first portion of the first model of the physical object;
   determining a second point of intersection of the casted ray at a second portion of the second model of the virtual object;
   determining a relative depth measurement between (1) the first point of intersection of the casted ray at the first portion of the first model of the physical object and (2) the second point of intersection of the casted ray at the second portion of the second model of the virtual object as measured from a viewpoint of the virtual camera; and
   rendering, based on the first model, the second model, and the relative depth measurement, an image depicting the physical object and the virtual object from a perspective of the user, wherein:
      the particular pixel of the image has a blended color contributed from respective colors of a corresponding portion of the physical object and a corresponding portion of the virtual object, and
      the blended color is computed in response to a determination that the relative depth measurement between (1) the first point of intersection of the casted ray at the first portion of the first model of the physical object and (2) the second point of intersection of the casted ray at the second portion of the second model of the virtual object as measured from the viewpoint of the virtual camera is within a predetermined threshold distance.

2. The method of claim 1, wherein the first portion of the first model of the physical object is closer to the perspective of the user than the second portion of the second model of the virtual object.

3. The method of claim 1, wherein the second portion of the second model of the virtual object is closer to the perspective of the user than the first portion of the first model of the physical object.

4. The method of claim 1, further comprising:
   in response to the determination that the relative depth measurement as measured from the viewpoint of the virtual camera is within the predetermined threshold distance, setting a color associated with the first portion of the first model of the physical object to have a translucency value.

5. The method of claim 4, further comprising:
   in response to the determination that the relative depth measurement as measured from the viewpoint of the virtual camera is within the predetermined threshold distance, setting a second color associated with the second portion of the second model of the virtual object to have a second translucency value.

6. The method of claim 1, wherein the blended color depends proportionately on a magnitude of the relative depth measurement.

7. The method of claim 1, wherein:
   at least a second pixel of the image has a color value that corresponds to a second portion of the first model of the physical object; and the color value is computed based on the second portion of the first model of the physical object in response to a determination that:
  the second portion of the first model of the physical object is closer to the perspective of the user than a third portion of the second model of the virtual object, and
  a second relative depth measurement between (1) the second portion of the first model of the physical object and (2) the third portion of the second model of the virtual object exceeds the predetermined threshold distance.

8. The method of claim 1, wherein:
at least a second pixel of the image has a color value that corresponds to a third portion of the second model of the virtual object; and
the color value is computed based on the second third portion of the second model of the virtual object in response to a determination that:
  the second third portion of the second model of the virtual object is closer to the perspective of the user than a second portion of the first model of the physical object, and a second relative depth measurement between (1) the second portion of the first model of the physical object and (2) the second third portion of the second model of the virtual object exceeds the predetermined threshold distance.

9. The method of claim 1, wherein the computing system is associated with a head-mounted device that blocks the user from seeing the physical environment directly.

10. The method of claim 9, wherein:
the perspective of the user corresponds to a first eye of the user; and
the rendered image is displayed on a first display of the head-mounted device configured to be viewed by the first eye of the user.

11. One or more computer-readable non-transitory storage media embodying software that is operable when executed to:
compute, based on sensor data, estimated depth measurements of at least one physical object in a physical environment surrounding a user;
generate, based on the estimated depth measurements, a first model of the at least one physical object;
access a second model of a virtual object;
cast a ray from a virtual camera through a particular pixel in screen space;
determine a first point of intersection of the casted ray at a first portion of the first model of the physical object;
determine a second point of intersection of the casted ray at a second portion of the second model of the virtual object;
determine a relative depth measurement between (1) the first point of intersection of the casted ray at the first portion of the first model of the physical object and (2) the second point of intersection of the casted ray at the second portion of the second model of the virtual object as measured from a viewpoint of the virtual camera; and
render, based on the first model, the second model, and the relative depth measurement, an image depicting the physical object and the virtual object from a perspective of the user, wherein:
  the particular pixel of the image has a blended color contributed from respective colors of a corresponding portion of the physical object and a corresponding portion of the virtual object, and
  the blended color is computed in response to a determination that the relative depth measurement between (1) the first point of intersection of the casted ray at the first portion of the first model of the physical object and (2) the second point of intersection of the casted ray at the second portion of the second model corresponding to the portion of the virtual object as measured from the viewpoint of the virtual camera is within a predetermined threshold distance.

12. The media of claim 11, wherein the first portion of the first model of the physical object is closer to the perspective of the user than the second portion of the second model of the virtual object.

13. The media of claim 11, wherein the second portion of the second model of the virtual object is closer to the perspective of the user than the first portion of the first model of the physical object.

14. The media of claim 11, wherein the software is further operable when executed to:
in response to the determination that the relative depth measurement as measured from the viewpoint of the virtual camera is within the predetermined threshold distance, set a color associated with the first portion of the first model of the physical object to have a translucency value.

15. The media of claim 11, wherein the blended color depends proportionately on a magnitude of the relative depth measurement.

16. A system comprising:
one or more processors; and
one or more computer-readable non-transitory storage media coupled to one or more of the processors and comprising instructions operable when executed by one or more of the processors to cause the system to:
compute, based on sensor data, estimated depth measurements of at least one physical object in a physical environment surrounding a user;
generate, based on the estimated depth measurements, a first model of the at least one physical object;
access a second model of a virtual object;
cast a ray from a virtual camera through a particular pixel in screen space;
determine a first point of intersection of the casted ray at a first portion of the first model of the physical object;
determine a second point of intersection of the casted ray at a second portion of the second model of the virtual object;
determine a relative depth measurement between (1) the first point of intersection of the casted ray at the first portion of the first model of the physical object and (2) the second point of intersection of the casted ray at the second portion of the second model of the virtual object as measured from a viewpoint of the virtual camera; and
render, based on the first model, the second model, and the relative depth measurement, an image depicting the physical object and the virtual object from a perspective of the user, wherein:
  the particular pixel of the image has a blended color contributed from respective colors of a corresponding portion of the physical object and a corresponding portion of the virtual object, and
  the blended color is computed in response to a determination that the relative depth measurement between (1) the first point of intersection of the casted ray at the first portion of the first model of the physical object and (2) the second point of intersection of the casted ray at the second portion of the second model of the virtual object as measured from the viewpoint of the virtual camera is within a predetermined threshold distance.

17. The system of claim 16, wherein the first portion of the first model of the physical object is closer to the perspective of the user than the second portion of the second model of the virtual object.

18. The system of claim 16, wherein the second portion of the second model of the virtual object is closer to the perspective of the user than the first portion of the first model of the physical object.

19. The system of claim 16, wherein the instructions are further operable when executed to cause the system to:
   in response to the determination that the relative depth measurement as measured from the viewpoint of the virtual camera is within the predetermined threshold distance, set a color associated with the first portion of the first model of the physical object to have a translucency value.

20. The system of claim 16, wherein the blended color depends proportionately on a magnitude of the relative depth measurement.

* * * * *